United States Patent
Rapowitz et al.

(10) Patent No.: US 12,406,446 B2
(45) Date of Patent: Sep. 2, 2025

(54) AUGMENTED REALITY TECHNIQUES TO IDENTIFY A MERCHANT CATEGORY CODE ASSOCIATED WITH A TRANSACTION

(71) Applicant: Capital One Services, LLC, McLean, VA (US)

(72) Inventors: Samuel Rapowitz, Roswell, GA (US); Ashleigh Choi, Arlington, VA (US); John Jones, Alexandria, VA (US); Armando Martinez Stone, Arlington, VA (US); Andrew Shelton, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 186 days.

(21) Appl. No.: 18/188,693

(22) Filed: Mar. 23, 2023

(65) Prior Publication Data
US 2024/0320929 A1    Sep. 26, 2024

(51) Int. Cl.
G06T 19/00    (2011.01)
G06Q 20/20    (2012.01)
G06Q 20/32    (2012.01)
G06Q 20/42    (2012.01)
G06V 10/44    (2022.01)

(52) U.S. Cl.
CPC ........... *G06T 19/006* (2013.01); *G06Q 20/20* (2013.01); *G06Q 20/3278* (2013.01); *G06Q 20/42* (2013.01); *G06V 10/44* (2022.01); *G06V 2201/07* (2022.01)

(58) Field of Classification Search
CPC .. G06T 19/006; G06Q 20/20; G06Q 20/3278; G06Q 20/42; G06V 10/44; G06V 2201/07
See application file for complete search history.

(56) References Cited

U.S. PATENT DOCUMENTS

| 2022/0005040 A1* | 1/2022 | Edwards | G06Q 20/4016 |
| 2024/0046329 A1* | 2/2024 | Maschmeyer | G06T 19/006 |
| 2024/0062210 A1* | 2/2024 | Shoup | G06Q 20/204 |

* cited by examiner

Primary Examiner — Sing-Wai Wu
(74) *Attorney, Agent, or Firm* — Harrity & Harrity, LLP (57) ABSTRACT

In some implementations, an augmented reality device may establish a link with a transaction device. The augmented reality device may scan a surrounding environment to identify one or more objects in the surrounding environment using computer vision. The augmented reality device may determine, based on a notification that the transaction device was used to perform a transaction, a category associated with one or more objects that were identified in the surrounding environment at a time that the transaction was performed. The augmented reality device may send, to a transaction backend system, information that identifies a merchant category code (MCC) associated with the transaction based on the category associated with the one or more objects that were identified in the surrounding environment at the time that the transaction was performed.

20 Claims, 6 Drawing Sheets

AUGMENTED REALITY TECHNIQUES TO IDENTIFY A MERCHANT CATEGORY CODE ASSOCIATED WITH A TRANSACTION

BACKGROUND

Augmented reality (AR) is a technology that can superimpose or overlay digital content onto real-world images to create a blended interactive experience that enhances a user's perception of their surroundings. The digital content that is superimposed or overlaid onto the real-world images can span multiple sensory modalities, including visual, auditory, haptic, somatosensory, and/or olfactory. AR technology generally incorporates a combination of real and virtual worlds, real-time interaction, and accurate three-dimensional registration of virtual and real objects. The superimposed or overlaid digital content can be constructive (e.g., additive to the images of the real-world environment) or destructive (e.g., masking aspects of the real-world environment). The AR experience is seamlessly interwoven with the physical world such that the AR content is perceived as an immersive aspect of the real environment. In this way, AR alters a user's ongoing perception of a real-world environment, in contrast to virtual reality that completely replaces the user's real-world environment with a simulated environment.

SUMMARY

Some implementations described herein relate to an augmented reality (AR) device for categorizing a transaction. The AR device may include one or more memories and one or more processors coupled to the one or more memories. The one or more processors may be configured to establish a link with a transaction device. The one or more processors may be configured to scan a surrounding environment to identify one or more objects in the surrounding environment using computer vision. The one or more processors may be configured to determine, based on a notification that the transaction device was used to perform a transaction, a category associated with one or more objects that were identified in the surrounding environment at a time that the transaction was performed. The one or more processors may be configured to send, to a transaction backend system, information that identifies a merchant category code (MCC) associated with the transaction based on the category associated with the one or more objects that were identified in the surrounding environment at the time that the transaction was performed.

Some implementations described herein relate to a method for categorizing a transaction. The method may include scanning, by an AR device, a surrounding environment. The method may include determining, by the AR device, based on a notification that a transaction device linked to the AR device was used to perform a transaction, a category associated with one or more objects that were identified in the surrounding environment at a time that the transaction was performed. The method may include sending, by the AR device, to a transaction backend system, information that identifies an MCC associated with the transaction based on the category associated with the one or more objects that were identified in the surrounding environment at the time that the transaction was performed.

Some implementations described herein relate to a non-transitory computer-readable medium that stores a set of instructions. The set of instructions, when executed by one or more processors of a one or more instructions that, when executed by one or more processors of an AR device, may cause the one or more instructions that, when executed by one or more processors of an AR device to scan a surrounding environment to identify one or more objects in the surrounding environment using computer vision. The set of instructions, when executed by one or more processors of the one or more instructions that, when executed by one or more processors of an AR device, may cause the one or more instructions that, when executed by one or more processors of an AR device to determine, based on a notification that a transaction device was used to perform a transaction, a category associated with one or more objects that were identified in the surrounding environment at a time that the transaction was performed. The set of instructions, when executed by one or more processors of the one or more instructions that, when executed by one or more processors of an AR device, may cause the one or more instructions that, when executed by one or more processors of an AR device to send, to a transaction backend system, information that identifies an MCC associated with the transaction based on the category associated with the one or more objects that were identified in the surrounding environment at the time that the transaction was performed.

DETAILED DESCRIPTION

The following detailed description of example implementations refers to the accompanying drawings. The same reference numbers in different drawings may identify the same or similar elements.

Some implementations described herein use augmented reality (AR) technology to identify a merchant category code (MCC) associated with a transaction. As a result, relative to techniques that rely solely on an MCC indicated in a record associated with the transaction, some implementations described herein may increase the accuracy of an MCC associated with a transaction by using AR and computer vision techniques in combination with contextual (e.g., location-based) information to determine a probable MCC based on images of a surrounding environment when the transaction occurred. In this way, some implementations described herein reduce a rate of declined transactions, reduce false alarms relating to potentially fraudulent activity, and/or address other potential consequences caused by incorrect or inaccurate MCCs.

For example, as described herein, an MCC is a four-digit number that credit card companies use to classify a merchant that originates retail financial transactions based on the goods, services, and/or trade supplied by the merchant. MCCs are defined in one or more standards that are employed in transaction processing networks, such as International Standard Organization (ISO) 18245. In general, an MCC is assigned to a merchant by a credit card company when the merchant starts to accept credit card payments. The same business may be associated with different MCCs for different credit card issuers, and different sections or departments within a store may be associated with different MCCs. The MCC assigned to a merchant generally reflects the primary category in which the merchant does business, and can be used for various purposes. For example, the MCC associated with a merchant may be used to determine an interchange fee paid by the merchant (e.g., a fee paid between banks for the acceptance of credit card transactions), to offer cash back rewards or points (e.g., for spending in specific categories), to define rules and restrictions for credit card transactions, to determine whether a credit card payment needs to be reported to regulatory agencies (e.g., the Internal Revenue Service), to categorize merchants for the purpose of tracking sales, to monitor potential fraudulent activity, and/or to provide budgeting or financial management applications (e.g., to allow users to view spending patterns in different categories), among other examples.

In general, when a merchant processes a credit card transaction at a transaction terminal (e.g., a point-of-sale (POS) terminal or an electronic commerce server), the transaction terminal includes the MCC associated with the merchant among various attributes associated with the transaction that are passed to a transaction backend system (e.g., for requesting approval of the transaction). However, there are various reasons why the MCC passed to the transaction backend system could be inaccurate. For example, the MCC passed to the transaction backend system could be inaccurate due to human error that occurs when a transaction terminal is configured (e.g., a person configuring the transaction terminal may enter the wrong MCC or may enter an MCC that does not accurately reflect the business of a merchant, such as a transaction terminal at a drug store that also sells household items being configured with the MCC of a retail store rather than a drug store). In another example, the MCC passed to the transaction backend system may be inaccurate following a change in business operations (e.g., if a merchant changes the products or services that the merchant offers, such as a restaurant starting to sell groceries, the MCC associated with the merchant may cease to accurately the business of the merchant). In another example, the MCC passed to the transaction backend system may be inaccurate following a change to the MCC list (e.g., the MCC used by a merchant may become outdated).

In general, there can be significant consequences when the MCC passed to the transaction backend system is incorrect or inaccurate. For example, an incorrect or inaccurate MCC may affect the ability of a merchant to process credit card transactions and/or may impact an ability of the merchant to receive credit card payments from customers. Additionally, an incorrect MCC can result in merchants being flagged for potential fraudulent activity (e.g., using an MCC associated with merchandise sales, which do not need to be reported to regulatory agencies, versus payments that are primarily for services, which do need to be reported to regulatory agencies), which can result in additional scrutiny from credit card networks and acquiring banks. Furthermore, inaccurate or incorrect MCCs can cause inaccuracies in downstream applications that rely on the MCCs, such as erroneously awarding or failing to award cash back rewards or points for spending in certain categories or indicating incorrect spending amounts in financial management applications that analyze consumer spending.

Accordingly, in some implementations, AR may be used to identify an MCC associated with a transaction in order to increase the accuracy of the MCC associated with the transaction. For example, in some implementations, an AR device (e.g., smart eyeglasses, a wearable headset, a smartphone equipped with AR capabilities, or the like) may be linked to a transaction device to initiate an AR session in which the AR device scans a surrounding environment while a user of the AR device is shopping in a physical location or online. In some implementations, during the AR session, the AR device may use computer vision techniques to process various aspects of the surrounding environment (e.g., a layout of the surrounding environment, objects that are present in the surrounding environment, or the like), and digital content related to the various aspects of the surrounding environment may be overlaid or superimposed over a view of the surrounding environment on a user interface associated with the AR device. In some implementations, when the transaction device is used to perform a transaction, the AR device may receive a notification indicating that the transaction occurred and may process the information related to the surrounding environment in a time period associated with the transaction. Accordingly, the information related to the surrounding environment in the time period associated with the transaction may be cross-referenced with one or more data sources to determine a context associated with the transaction (e.g., location information), which may be used to identify a probable MCC associated with the transaction. The AR device may then send the probable MCC associated with the transaction to a transaction backend system, which may store the probable MCC in a data repository as an additional column associated with the transaction (e.g., for use in a merchant cleansing system, budgeting applications, rewards programs, merchant auditing, and/or any other suitable use case). In this way, any system that processes data associated with the transactions that are processed through the transaction backend system may use an accurate MCC, which may reduce a rate of declined transactions, reduce false alarms relating to potential fraudulent activity, flag transactions that need to be reported to regulatory agencies, increase the accuracy of interchange fees paid by merchants, increase the accuracy of financial management tools that are used to manage spending, and/or address other potential consequences caused by incorrect or inaccurate MCCs.

Figure 1A:
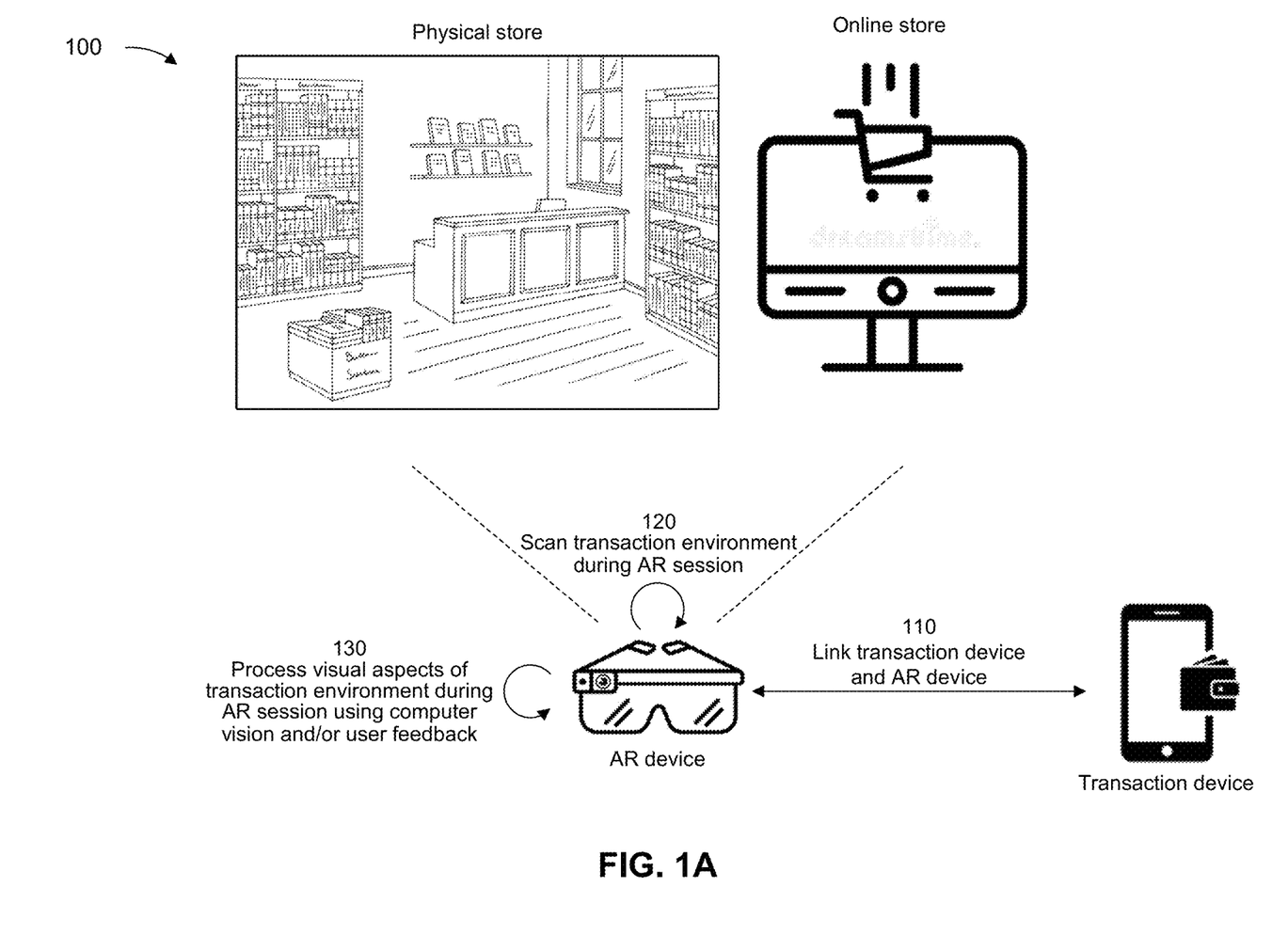
FIGS. 1A-1B are diagrams of an example associated with augmented reality (AR) techniques to identify a merchant category code (MCC) associated with a transaction, in accordance with some embodiments of the present disclosure.
Figure 1B:
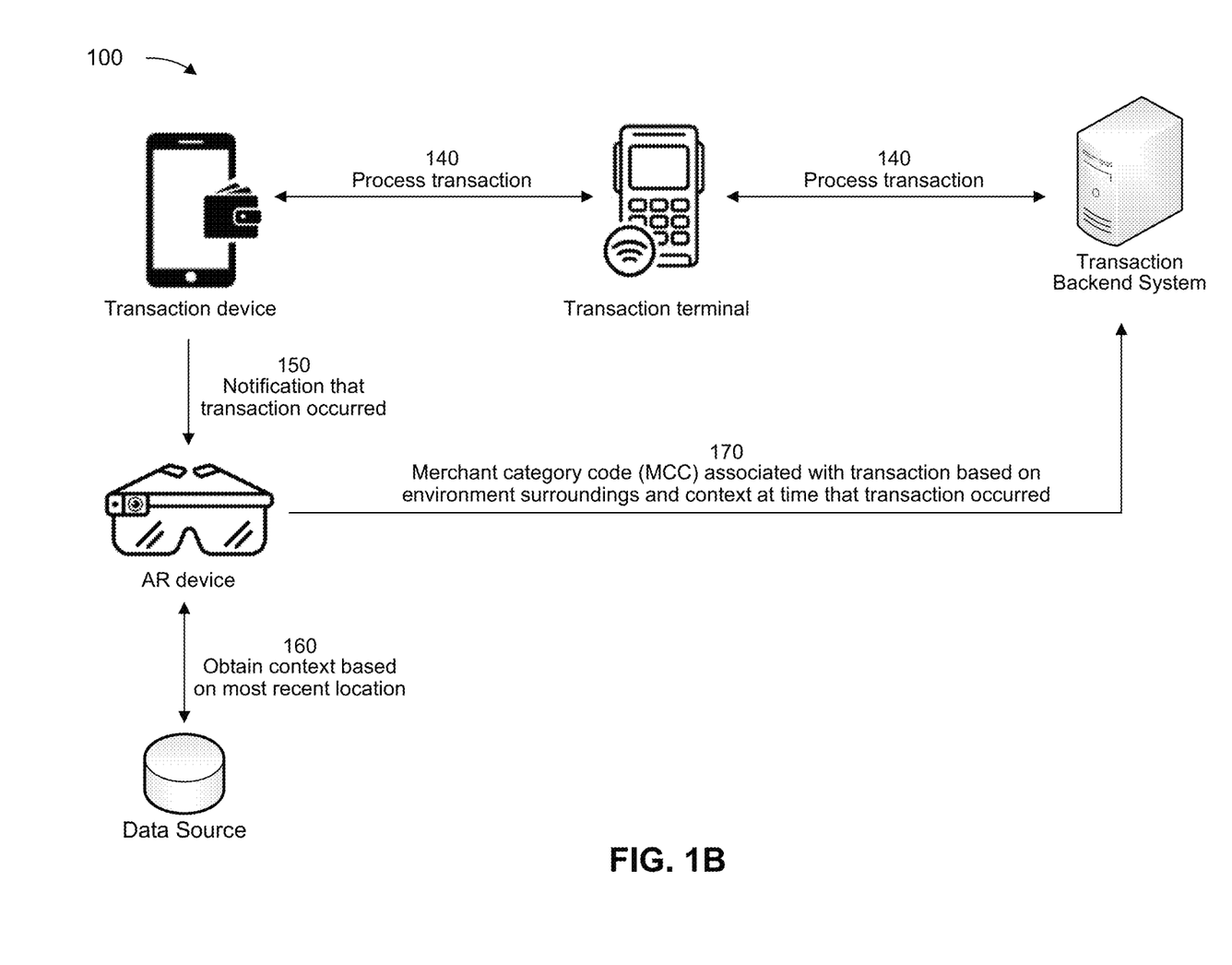

FIGS. 1A-1B are diagrams of an example 100 associated with AR techniques to identify an MCC associated with a transaction. As shown in FIGS. 1A-1B, example 100 includes a transaction device, an AR device, a transaction terminal, and a transaction backend system. The transaction device, the AR device, the transaction terminal, and the transaction backend system are described in more detail in connection with FIG. 3 and FIG. 4.

As shown in FIG. 1A, and by reference number 110, the AR device may establish a link with a transaction device. For example, as described herein, the AR device may be any suitable device that includes one or more sensors (e.g., one or more cameras, image sensors, infrared cameras, laser sensors, and/or other suitable sensors) that can capture one or more images and/or data related to physical attributes of a real-world environment within a field of view of the AR device. For example, in some implementations, the AR device may correspond to a mobile device (e.g., a smartphone or a tablet), a mixed reality headset (e.g., an optical see-through display, a video see-through display, a holographic display, a heads-up display, or smart glasses), or another suitable device equipped with AR capabilities. Furthermore, as described herein, the transaction device may be a transaction card (or another physical medium with integrated circuitry) capable of storing and communicating account information, such as a credit card, a debit card, a gift card, an ATM card, a transit card, a fare card, and/or an access card. Alternatively, in some implementations, the transaction device may correspond to a mobile device or may be integrated into a mobile device that executes an electronic payment application (e.g., a digital wallet) or has other suitable mobile payment capabilities.

Accordingly, in some implementations, the AR device and the transaction device may be integrated within a single device (e.g., a smartphone having AR capabilities and mobile payment capabilities), or the AR device and the transaction device may be separate devices. Furthermore, in cases where the AR device and the transaction device are separate devices, either the AR device or the transaction device may correspond to or may be integrated with a mobile device (e.g., a user carrying a smartphone equipped with AR capabilities may also be carrying a transaction card corresponding to the transaction device, or a user carrying a smartphone equipped with mobile payment capabilities may also be wearing a headset that corresponds to the AR device). Alternatively, the AR device and the transaction device may be separate from a mobile device (e.g., a user carrying a smartphone may also be wearing a headset that corresponds to the AR device and carrying a transaction card corresponding to the transaction device).

Accordingly, as described herein, the AR device may establish a link with the transaction device via any suitable process that makes the AR device aware of the transaction device such that the AR device can then suitably determine when a transaction has been performed using the transaction device. For example, in cases where the AR device and the transaction device are separate devices, the link may be established between the AR device and the transaction device through near field communication (NFC) (e.g., by tapping the AR device and the transaction device together or otherwise bringing the AR device and the transaction device into sufficient proximity). Additionally, or alternatively, the link between the AR device and the transaction device may established by allowing the AR device to electronically read the card (e.g., by reading an integrated circuit (IC) chip, such as a EUROPAY®, MASTERCARD®, VISA® (EMV) chip, from the transaction device and/or communicating with the transaction device via an NFC component, a radio frequency (RF) component, a Bluetooth component, and/or a Bluetooth Low Energy (BLE) component, among other examples).

Additionally, or alternatively, the AR device may use the AR capabilities of the AR device to establish the link with the transaction device. For example, in cases where the AR device and the transaction device are separate devices, the transaction device (e.g., a transaction card or mobile device equipped with mobile payment capabilities) may be positioned within a field of view of the AR device, which may use computer vision techniques to detect the transaction device and/or relevant visible information associated with the transaction device (e.g., a credit card number, credit card company logo, a credit card issuer logo, a card verification value (CVV), or other visible information associated with the transaction device). In this way, the link between the AR device and the transaction device may be an AR-based link (e.g., an AR-based registration of the transaction device and/or the relevant visible information associated with the transaction device), whereby the AR device may subsequently track the transaction device and/or the relevant visible information associated with the transaction device within the field of view of the AR device. Alternatively, in cases where the AR device and the transaction device are integrated within a single device (e.g., a mobile device equipped with AR and mobile payment capabilities), the link between the AR device and the transaction device may be an application-based link that enables the AR device to be notified (e.g., by a digital wallet or electronic payment application) when the transaction device is used.

As further shown in FIG. 1A, and by reference number 120, the AR device may scan a transaction environment surrounding the AR device during an AR session. For example, in some implementations, the AR session may be triggered or initiated when the link is established between the AR device and the transaction device. Additionally, or alternatively, the AR session may be triggered or initiated when a user of the AR device opens a suitable application, such as a shopping application, an electronic payment application, and/or an AR application, among other examples. In any case, during the AR session, the AR device may scan a surrounding environment in a field of view of the AR device. For example, in some implementations, the AR session may be triggered to capture images and/or video of an environment or context in which the user of the AR device expects to perform a transaction using the transaction device such that various aspects of the transaction environment can be captured and characterized to determine a probable MCC associated with the transaction. Accordingly, during the AR session, the AR device may use the one or more sensors (e.g., cameras and other sensors) to capture images or video of the surrounding environment or context in which the user of the AR device expects to perform one or more transactions using the transaction device. For example, in some implementations, the AR session may be associated with an in-person shopping experience at a physical store, an online shopping experience at an online store (e.g., an electronic commerce website), and/or any other suitable setting where transactions may be performed using the transaction device (e.g., a location where payments are accepted for goods, services, and/or trades), and the AR device may be configured to scan the surrounding transaction environment to capture images or video that can be processed to predict the probable MCC when the transaction device is used to perform a transaction.

As further shown in FIG. 1A, and by reference number 130, the AR device may process various visual aspects of the transaction environment during the AR session. For example, in a physical transaction environment, such as a physical store or another physical location where payments are accepted at a POS, the AR device may use computer vision techniques and/or feedback from the user of the AR device to identify one or more objects that are present in the transaction environment and/or other visual details or characteristics relevant to the goods, services, and/or trades that are primarily supplied at the physical location. For example, in some implementations, the AR device may identify objects that relate to goods, services, or trades offered for sale at the physical location. For example, in a grocery store, the AR device may identify objects such as food items, household cleaning products, beverages, magazines, or other items that are typically sold at grocery stores. In another example, in a drug store, the AR device may identify objects such as over-the-counter or prescription medications, cosmetics, medical devices, and/or other items that are typically sold at drug stores. In other examples, the AR device may identify objects such as clothing items, hardware items, electronic equipment, stationery, flowers, exercise equipment, and/or other objects depending on the surrounding transaction environment. Furthermore, in cases where the transaction environment is a physical location where services or trades are provided, the AR device may identify objects related to the services or trades provided at the physical location (e.g., objects identified in a physical location where veterinary services are rendered may include pictures of animals and pamphlets related to pet health, objects identified in a physical location where automotive repair services are provided may include automotive parts and equipment used to repair or otherwise service vehicles, and objects identified in a physical location where entertainment services are rendered may include bowling lanes, pool tables, or the like, among other examples).

Furthermore, in some implementations, the images or video of the transaction environment surrounding the AR device may include signage or other information that indicates the nature of the goods, services, or trades supplied at the physical location. For example, in some implementations, the AR device may identify, in the images or video of the transaction environment, information that relates to a name of an establishment, descriptions of goods, services, or trades offered for sale at the physical location, a layout of the physical location, or the like. For example, a typical grocery store may include a layout with various sections or departments dedicated to specific grocery items (e.g., produce, butcher, bakery, or the like), one or more lanes where refrigerated items are sold (e.g., eggs, dairy, cheeses, or the like), one or more lanes where frozen items are sold, and various lanes where shelf-stable items are sold. In another example, a typical drug store may have a layout with a pharmacy section located in a specific area, various lanes where household items are sold, and a checkout area where non-pharmacy purchases can be made. In other examples, the layout may be associated with medical services (e.g., a reception area and/or a waiting area separated from offices or rooms where the medical services are provided), and/or a hardware store (e.g., a landscaping section, a paint section, an appliances section, or the like). Furthermore, merchants in various categories (e.g., airlines, car rental services, lodging, or the like) may be associated with a merchant-specific MCC, whereby the AR device may identify the name of the establishment to assist in determining the probable MCC in a given transaction context.

Additionally, or alternatively, in cases where the transaction environment surrounding the AR device is an online transaction environment (e.g., an online store or an online payment portal), the AR device may scan information on a screen of a device that the user is interacting with to perform the transaction (e.g., a screen of a computer monitor, a laptop, a tablet, a smartphone, or another suitable device being used to perform the transaction). For example, in some implementations, the AR device may identify objects or information such as a uniform resource locator (URL) or logo that indicates the online merchant and/or may identify visual details or characteristics such as objects that are displayed on the screen, price information, and/or categories of products or services, among other examples.

In some implementations, the AR device may identify one or more anchor points in the images or video of the surrounding transaction environment to render digital content related to the visual aspects of the transaction environment such that the user of the AR device can provide feedback to confirm or correct the identification performed by the AR device. For example, in some implementations, the AR device may use computer vision techniques to identify the objects, layouts, and/or other visual details of the transaction environment, such as a convolutional neural network (CNN) technique, to assist in classifying the image data (e.g., data relating to distinctive feature points in the image data) into a particular class (e.g., a class indicating that the feature points share a planar surface and therefore belong to a common part). In some cases, the computer vision technique may identify the one or more parts depicted in the image data using an image recognition technique (e.g., an Inception framework, a ResNet framework, a Visual Geometry Group (VGG) framework, or the like), an object detection technique (e.g. a Single Shot Detector (SSD) framework, a You Only Look Once (YOLO) framework, or the like), an object in motion technique (e.g., an optical flow framework), an image segmentation technique, or other suitable techniques. For example, in some implementations, the AR device may partition one or more digital images or video frames into multiple segments that include various pixels, super-pixels, or the like, which can be used to locate objects and boundaries (e.g., lines, curves, etc.) in the digital image(s) or video frame(s). The AR device may assign a label to each pixel such that pixels with the same label may share certain characteristics (e.g., belonging to the same object). Additionally, or alternatively, the AR device may use an edge detection technique to identify points in the digital image(s) or video frame(s) at which brightness changes sharply or has discontinuities, which may indicate shapes, boundaries, or other suitable features of the objects in the surrounding transaction environment.

Accordingly, in some implementations, the AR device may render digital content on an interface of the AR device to indicate the visual features of the transaction environment that were identified using computer vision techniques, whereby the user of the AR device may interact with the digital content to confirm or correct the computer vision-based identification of the visual features of the transaction environment. In some implementations, the digital content may include a description of the object and/or information related to a context of the object within the surrounding environment. For example, in a grocery store, the digital content may include an overlay that is superimposed over a red fruit to indicate that an apple was identified and/or an overlay that is displayed in the interface of the AR device to indicate that the apple appears to be located in the produce section of a grocery store. Accordingly, the user may provide feedback to confirm the accuracy of object identifications and/or environmental context predictions performed by computer vision techniques and/or to correct the object identifications and/or environmental context predictions performed by the computer vision techniques. Additionally, or alternatively, during the AR session, digital content may be rendered on the interface of the AR device to provide instructions for the user to obtain more information about the transaction environment and/or the objects presented in the transaction environment. For example, the instructions may request that the user explore different areas within a physical location, observe objects at different angles and/or orientations, navigate different pages of an online environment, or the like, in order to increase the amount of detail gathered about the transaction environment.

As shown in FIG. 1B, and by reference number 140, the transaction device may be used to perform a transaction at a transaction terminal. For example, in a physical transaction environment, the transaction device (e.g., a transaction card or a mobile device with electronic payment capabilities) may communicate with the transaction terminal by coming into contact with the transaction terminal (e.g., using a magnetic stripe or an EMV chip) or via contactless communication (e.g., using NFC). Additionally, or alternatively, in an online transaction environment, information associated with the transaction device (e.g., a credit card number, CVV, billing address, or the like) may be communicated to the transaction terminal over a network. As shown, the transaction terminal may further communicate with a transaction backend system to process the transaction. For example, in some implementations, the transaction terminal may pass various attributes to the transaction backend system, such as an amount, a merchant name, an identifier of the transaction terminal, or the like, which may be processed by the transaction backend system (e.g., to approve or decline an electronic payment request). In some implementations, in cases where the transaction is approved by the transaction backend system, an approval notification may be sent to the transaction terminal and/or to the transaction device, and the transaction backend system may create a record of the transaction.

As further shown in FIG. 1B, and by reference number 150, the AR device may receive a notification indicating that the transaction device was used to perform the transaction. For example, in cases where the AR device and the transaction device are separate devices that have a capability to communicate (e.g., via NFC, Bluetooth, a wireless local area network (WLAN) link, or the like), the transaction device may send the notification to the AR device via the communication link established between the AR device and the transaction device. Additionally, or alternatively, in cases where the AR device and the transaction device are integrated within a single device (e.g., a smartphone with AR and mobile payment capabilities), the AR device may receive the notification that the transaction occurred via one or more application program interface (API) messages or other suitable application-layer messages. Additionally, or alternatively, the AR device may generate the notification internally based on detecting that the transaction device was used to perform the transaction from the images or video that the AR device captures from the surrounding transaction environment. For example, the AR device may detect, from the images or video of the surrounding transaction environment, that the transaction device was swiped, tapped, inserted, or otherwise presented at the transaction terminal. In another example, in an online transaction environment, the AR device may detect, from the images or video of the surrounding transaction environment, that the user provided information associated with the transaction device at a checkout page. In any case, because the AR device is linked to the transaction device (e.g., by a communication link, an AR-based link, an application-based link, or the like), the AR device may generally receive a notification when the transaction device is used to perform a transaction at a transaction terminal.

As further shown in FIG. 1B, and by reference number 160, the AR device may obtain relevant context information associated with the transaction environment from a data source based on a most recent location at a time when the transaction device was used to perform the transaction. For example, in some implementations, the AR device may obtain information that indicates a geolocation associated with the surrounding environment at the time the transaction was performed (e.g., based on the geolocation of the AR device, the transaction device, or a mobile device in communication with the AR device), which may be correlated with the information obtained from the data source to determine an establishment that is present at the geolocation where the transaction was performed. Accordingly, when the AR device receives the notification that the transaction was performed, the AR device may pull information that relates to the state of the surrounding transaction environment at the time that the transaction was performed and the information based on the geolocation where the transaction was performed to determine a probable MCC to associate with the transaction. For example, in some implementations, the AR device may identify information such as items that were purchased or exchanged in the transaction, a section within a physical or online location where the items were located within the transaction environment, and/or the establishment or location where the transaction occurred (e.g., a brick-and-mortar store, a farmer's market or pop-up store, a service provider establishment, or an online store or payment portal), among other examples. For example, in some implementations, the AR device may use a machine learning model or machine learning techniques to identify the probable MCC based on an overall context in which the transaction occurred. As further shown in FIG. 1B, and by reference number 170, the AR device may then send one or more MCCs associated with the transaction to the transaction backend system, where the one or more MCCs reported by the AR device may be stored as one or more additional columns associated with the record of the transaction. The one or more MCCs reported by the AR device may then be used in any suitable MCC use case, such as awarding cash back rewards or points for spending in certain categories, providing budgeting applications based on spending in different categories, and/or auditing merchant-configured MCCs that may be incorrect or inaccurate, among other examples.

As indicated above, FIGS. 1A-1B are provided as an example. Other examples may differ from what is described with regard to FIGS. 1A-1B.

Figure 2:
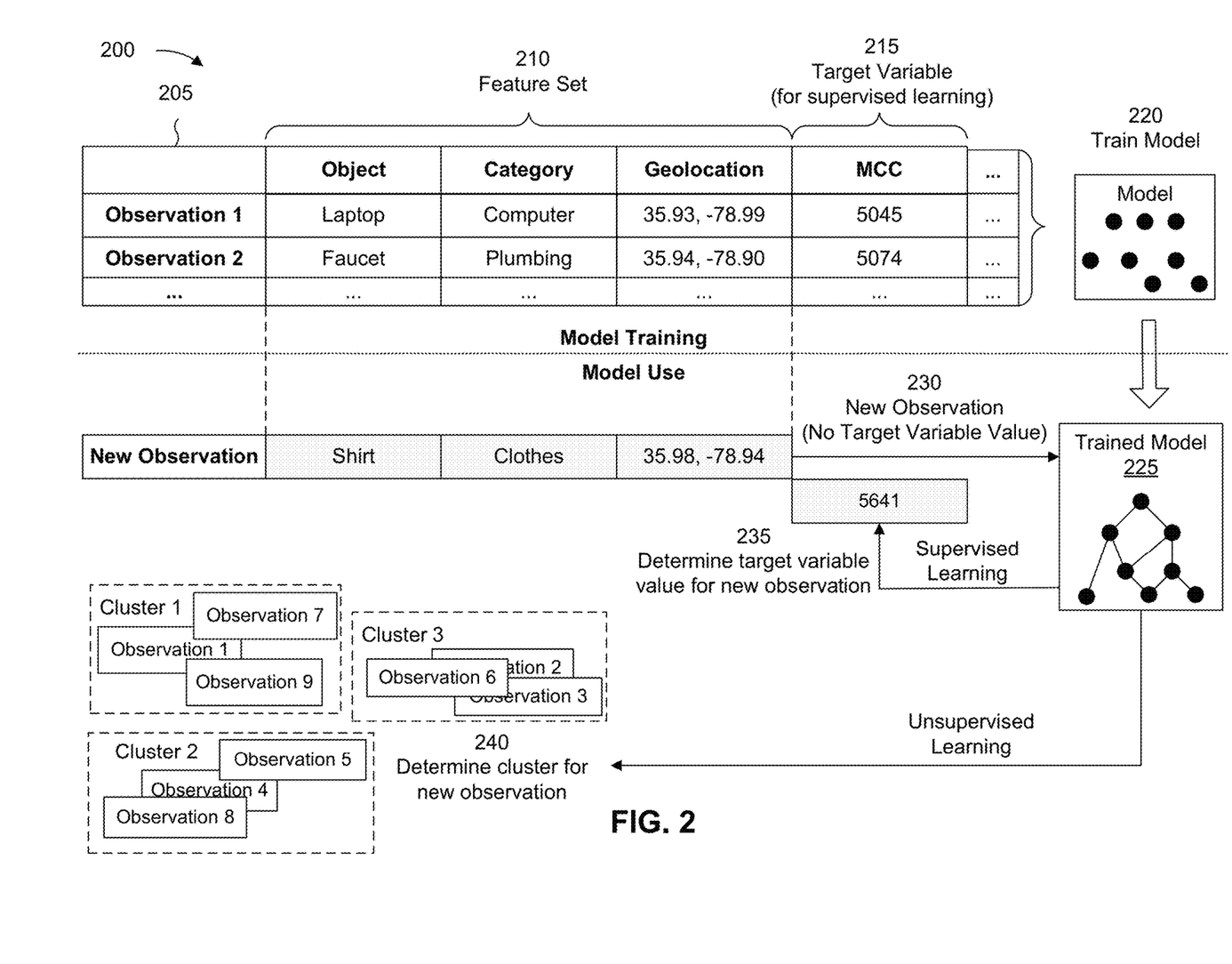
FIG. 2 is a diagram illustrating an example of training and using a machine learning model in connection with AR techniques to identify an MCC associated with a transaction, in accordance with some embodiments of the present disclosure.

FIG. 2 is a diagram illustrating an example 200 of training and using a machine learning model in connection with AR techniques to identify an MCC associated with a transaction. The machine learning model training and usage described herein may be performed using a machine learning system. The machine learning system may include or may be included in a computing device, a server, a cloud computing environment, or the like, such as the AR device or mobile device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from one or more AR devices or mobile devices, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from one or more AR devices or mobile devices.

For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of object, a second feature of category, a third feature of geolocation, and so on. As shown, for a first observation, the first feature may have a value of laptop, the second feature may have a value of computer, the third feature may have a value of (35.93, −78.99), and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is MCC, which has a value of 5045 (e.g., corresponding to computers, computer peripheral equipment, and/or software) for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. In some implementations, the machine learning model may be used to identify a probable MCC associated with a transaction based on one or more aspects of an environment in which a user is shopping while wearing or using an AR device (e.g., a layout of a surrounding environment, one or more objects that are present in the surrounding environment, a location where the user is shipping, or the like). After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of shirt, a second feature of clothes, a third feature of (35.98, −78.94) and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 5641 for the target variable of MCC for the new observation (e.g., corresponding to a children's and infants' wear store), as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to review the MCC that a transaction terminal passed to a transaction backend system to determine whether the MCC passed to the transaction backend system matches the MCC that the machine learning system predicted for the new observation. The first automated action may include, for example, sending a message to the transaction terminal or merchant associated with the transaction terminal to indicate that the MCC associated with the transaction terminal should be changed based on a mismatch between the MCC passed to the transaction backend system and the predicted MCC.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., clothing stores), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include an indication of whether the MCC predicted by the machine learning system matches the MCC passed by a transaction terminal and/or an indication of whether the MCC predicted by the machine learning system was accurate or incorrect.

In this way, the machine learning system may apply a rigorous and automated process to predict a probable MCC based on one or more features obtained by an AR device scanning a surrounding environment in a time prior to, during, and/or after a transaction is performed. The machine learning system may enable recognition and/or identification of tens, hundreds, thousands, or millions of features and/or feature values for tens, hundreds, thousands, or millions of observations, thereby increasing accuracy and consistency and reducing delay associated with predicting a probable MCC relative to requiring computing resources to be allocated for tens, hundreds, or thousands of operators to manually identify the MCC using the features or feature values.

As indicated above, FIG. 2 is provided as an example. Other examples may differ from what is described in connection with FIG. 2.

Figure 3:
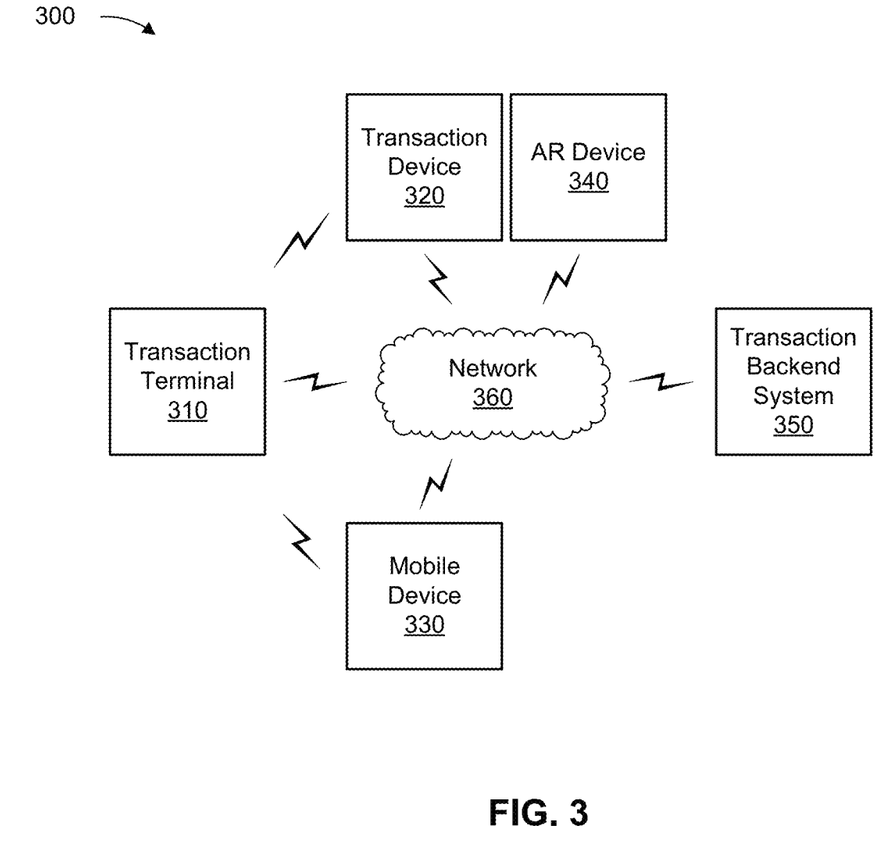
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a transaction terminal 310, a transaction device 320, a mobile device 330, an AR device 340, a transaction backend system 350, and/or a network 360. Devices of environment 300 may interconnect via wired connections and/or wireless connections.

The transaction terminal 310 may include one or more devices capable of facilitating an electronic transaction associated with the transaction device 320. For example, the transaction terminal 310 may include a POS terminal, a payment terminal (e.g., a credit card terminal, a contactless payment terminal, a mobile credit card reader, or a chip reader), and/or an automated teller machine (ATM). The transaction terminal 310 may include one or more input components and/or one or more output components to facilitate obtaining data (e.g., account information) from the transaction device 320 and/or to facilitate interaction with and/or authorization from an owner or accountholder of the transaction device 320. Example input components of the transaction terminal 310 include a number keypad, a touchscreen, a magnetic stripe reader, a chip reader, and/or an RF signal reader (e.g., an NFC reader). Example output devices of transaction terminal 310 include a display and/or a speaker. Additionally, or alternatively, the transaction terminal 310 may include a communication device and/or a computing device that can facilitate an electronic transaction via the network 360. For example, in some implementations, the transaction terminal 310 may include a server, such as an application server, a client server, a web server, a database server, a host server, a proxy server, a virtual server (e.g., executing on computing hardware), or a server in a cloud computing system. In some implementations, the transaction terminal 310 may include computing hardware used in a cloud computing environment.

The transaction device 320 may include one or more devices capable of being used for an electronic transaction. In some implementations, the transaction device 320 may include a transaction card (or another physical medium with integrated circuitry) capable of storing and communicating account information, such as a credit card, a debit card, a gift card, an ATM card, a transit card, a fare card, and/or an access card. In some implementations, the transaction device 320 may be the mobile device 330 or may be integrated into the mobile device 330. For example, the mobile device 330 may execute an electronic payment application capable of performing functions of the transaction device 320 described herein. Thus, one or more operations described herein as being performed by the transaction device 320 may be performed by a transaction card, the mobile device 330, or a combination thereof.

The transaction device 320 may store account information associated with the transaction device 320, which may be used in connection with an electronic transaction facilitated by the transaction terminal 310. The account information may include, for example, an account identifier that identifies an account (e.g., a bank account or a credit account) associated with the transaction device 320 (e.g., an account number, a card number, a bank routing number, and/or a bank identifier), a cardholder identifier (e.g., identifying a name of a person, business, or entity associated with the account or the transaction device 320), expiration information (e.g., identifying an expiration month and/or an expiration year associated with the transaction device 320), and/or a credential (e.g., a payment token). In some implementations, the transaction device 320 may store the account information in tamper-resistant memory of the transaction device 320, such as in a secure element. As part of performing an electronic transaction, the transaction device 320 may transmit the account information to the transaction terminal 310 using a communication component, such as a magnetic stripe, an IC chip (e.g., an EMV chip), and/or a contactless communication component (e.g., an NFC component, an RF component, a Bluetooth component, and/or a BLE component). Thus, the transaction device 320 and the transaction terminal 310 may communicate with one another by coming into contact with one another (e.g., using a magnetic stripe or an EMV chip) or via contactless communication (e.g., using NFC). Additionally, or alternatively, in cases where the transaction terminal 310 includes a communication device and/or a computing device that can facilitate an electronic transaction via the network 360 (e.g., a server associated with electronic commerce), the transaction device 320 and the transaction terminal 310 may communicate via the network 360.

The mobile device 330 may include one or more devices capable of being used for an electronic transaction, as described above in connection with the transaction device 320. The mobile device 330 may include a communication device and/or a computing device. For example, the mobile device 330 may include a wireless communication device, a mobile phone, a user equipment, a tablet computer, a wearable communication device (e.g., a smart wristwatch, a pair of smart eyeglasses, a head mounted display, or a virtual reality headset), or a similar type of device.

The AR device 340 may include one or more devices capable of receiving, generating, storing, processing, providing, and/or routing information associated with AR techniques to identify an MCC associated with a transaction, as described elsewhere herein. The AR device 340 may include a communication device and/or a computing device. For example, the AR device 340 may include a wireless communication device, a mobile phone, a user equipment, a laptop computer, a tablet computer, a gaming console, a wearable communication device (e g a smart wristwatch, a pair of smart eyeglasses, a head mounted display, or a virtual reality headset), or a similar type of device. The AR device 340 may include one or more image capture devices (e.g., one or more camera) configured to obtain one or more images of a surrounding environment and one or more objects in a field of view of the one or more image capture devices. In some implementations, the AR device 340 may be the mobile device 330 or may be integrated into the mobile device 330. For example, the mobile device 330 may execute an application that uses the AR device 340 to capture images of a surrounding environment and one or more objects in the surrounding environment and to provide an AR session in which AR content is overlaid on the captured images via a user interface of the AR device 340 in order to identify an MCC associated with a transaction. Thus, one or more operations described herein as being performed by the AR device 340 may be performed by the mobile device 330.

The transaction backend system 350 may include one or more devices capable of processing, authorizing, and/or facilitating a transaction. For example, the transaction backend system 350 may include one or more servers and/or computing hardware (e.g., in a cloud computing environment or separate from a cloud computing environment) configured to receive and/or store information associated with processing an electronic transaction. The transaction backend system 350 may process a transaction, such as to approve (e.g., permit, authorize, or the like) or decline (e.g., reject, deny, or the like) the transaction and/or to complete the transaction if the transaction is approved. The transaction backend system 350 may process the transaction based on information received from the transaction terminal 310, such as transaction data (e.g., information that identifies a transaction amount, a merchant, a time of a transaction, a location of the transaction, or the like), account information communicated to the transaction terminal 310 by the transaction device 320, and/or information stored by the transaction backend system 350 (e.g., for fraud detection).

The transaction backend system 350 may be associated with a financial institution (e.g., a bank, a lender, a credit card company, or a credit union) and/or may be associated with a transaction card association that authorizes a transaction and/or facilitates a transfer of funds. For example, the transaction backend system 350 may be associated with an issuing bank associated with the transaction device 320, an acquiring bank (or merchant bank) associated with the merchant and/or the transaction terminal 310, and/or a transaction card association (e.g., VISA® or MASTER-CARD®) associated with the transaction device 320. Based on receiving information associated with the transaction device 320 from the transaction terminal 310, one or more devices of the transaction backend system 350 may communicate to authorize a transaction and/or to transfer funds from an account associated with the transaction device 320 to an account of an entity (e.g., a merchant) associated with the transaction terminal 310.

The network 360 may include one or more wired and/or wireless networks. For example, the network 360 may include a cellular network, a public land mobile network, a local area network, a wide area network, a metropolitan area network, a telephone network, a private network, the Internet, and/or a combination of these or other types of networks. The network 360 enables communication among the devices of environment 300. In some implementations, the transaction terminal 310 may communicate with the transaction device 320 using a first network (e.g., a contactless network or by coming into contact with the transaction device 320) and may communicate with the transaction backend system 350 using a second network.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
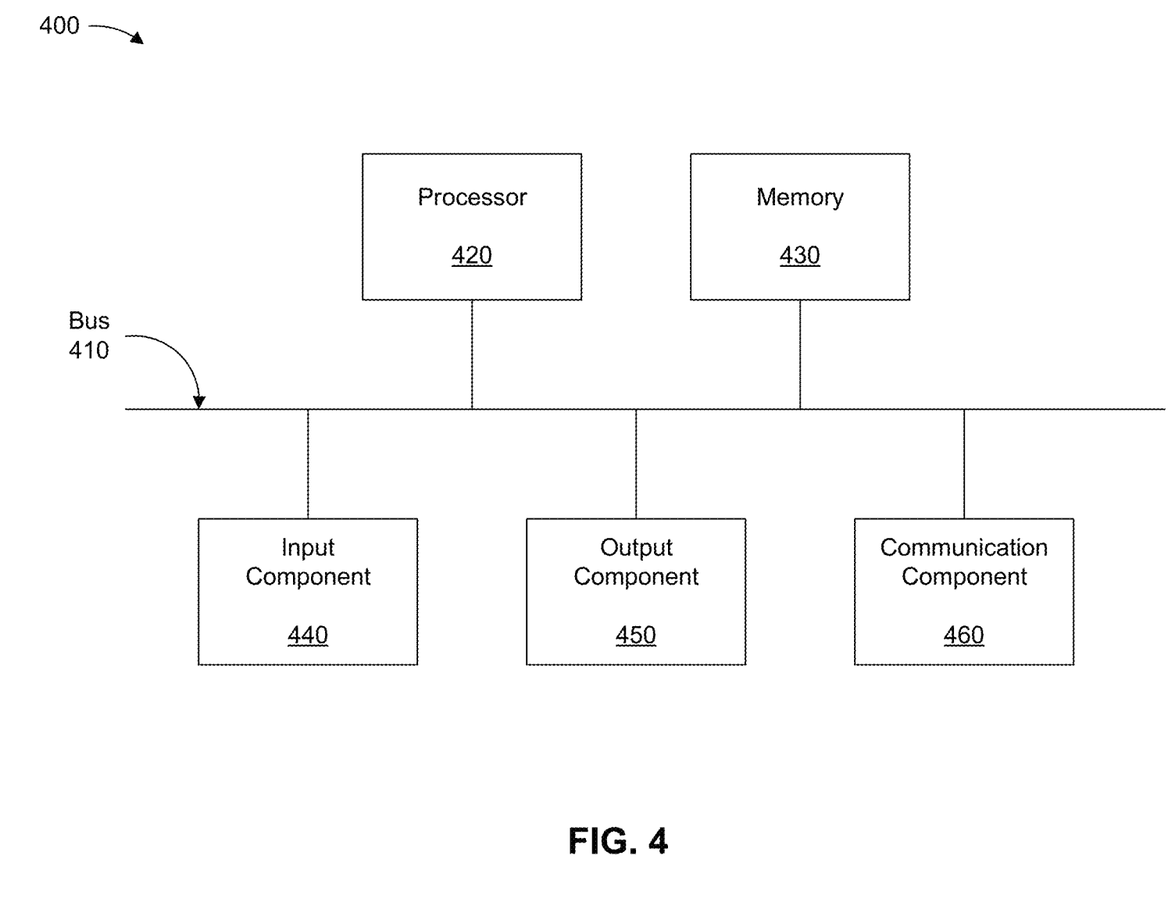
FIG. 4 is a diagram of example components of one or more devices of FIG. 3, in accordance with some embodiments of the present disclosure.

FIG. 4 is a diagram of example components of a device 400 associated with AR techniques to identify an MCC associated with a transaction. The device 400 may correspond to the transaction terminal 310, the transaction device 320, the mobile device 330, the AR device 340, and/or the transaction backend system 350. In some implementations, the transaction terminal 310, the transaction device 320, the mobile device 330, the AR device 340, and/or the transaction backend system 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
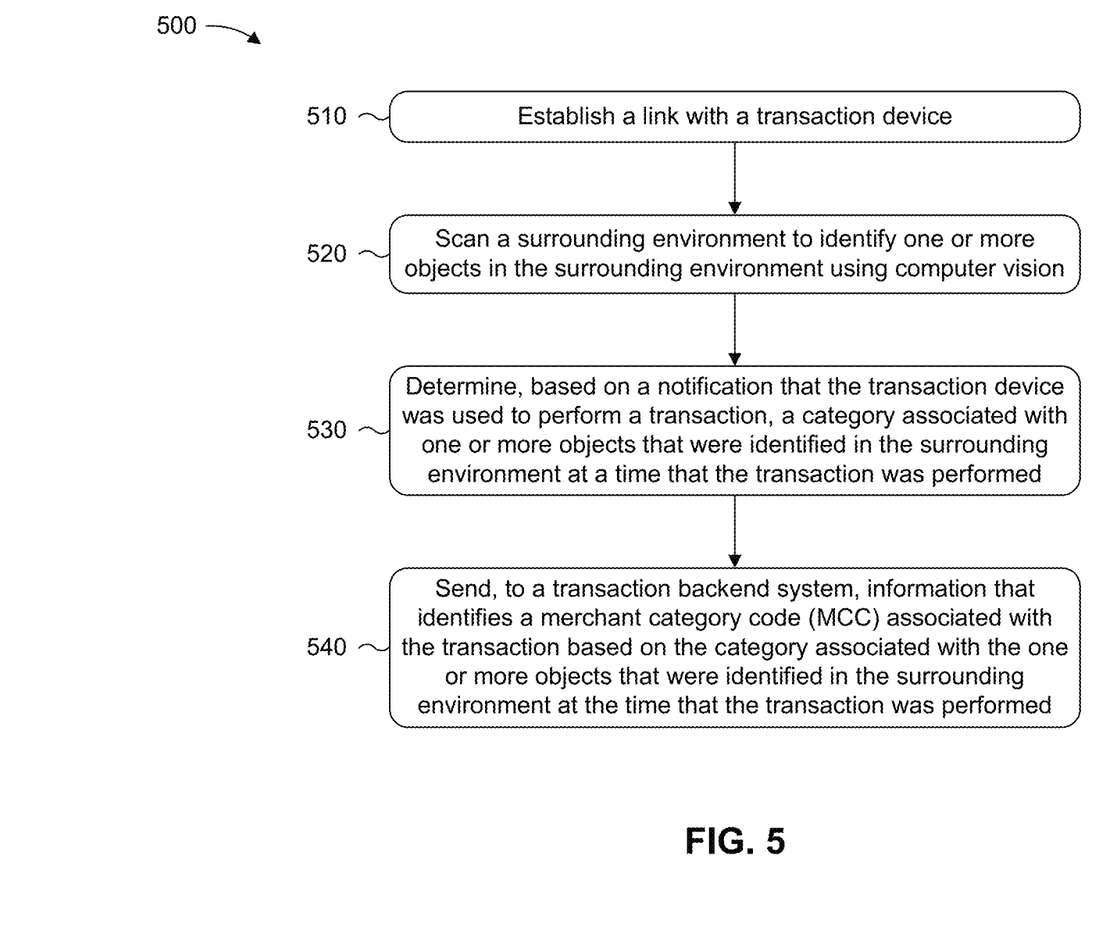
FIG. 5 is a flowchart of an example process associated with AR techniques to identify an MCC associated with a transaction, in accordance with some embodiments of the present disclosure.

FIG. 5 is a flowchart of an example process 500 associated with AR techniques to identify an MCC associated with a transaction. In some implementations, one or more process blocks of FIG. 5 may be performed by the AR device 340. In some implementations, one or more process blocks of FIG. 5 may be performed by another device or a group of devices separate from or including the AR device 340, such as the transaction terminal 310, the transaction device 320, the mobile device 330, and/or the transaction backend system 350. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include establishing a link with a transaction device (block 510). For example, the AR device 340 (e.g., using processor 420 and/or memory 430) may establish a link with a transaction device, as described above in connection with reference number 110 of FIG. 1A. As an example, the transaction device may be a transaction card equipped with an EMV chip or NFC communication capabilities or a mobile device equipped with mobile payment capabilities, and the link between the AR device and the transaction device may be established by bringing the transaction device and the AR device into contact or close proximity or by other suitable techniques (e.g., Bluetooth pairing). As another example, the transaction device and the AR device may be integrated into a single device (e.g., a mobile device equipped with AR and mobile payment capabilities), and the link between the transaction device and the AR device may be an AR-based link or application-based link.

As further shown in FIG. 5, process 500 may include scanning a surrounding environment to identify one or more objects in the surrounding environment using computer vision (block 520). For example, the AR device 340 (e.g., using processor 420 and/or memory 430) may scan a surrounding environment to identify one or more objects in the surrounding environment using computer vision, as described above in connection with reference numbers 120 and 130 of FIG. 1A. As an example, the AR device may identify objects that relate to goods, services, and/or trades for which payments are accepted in the surrounding environment and/or may identify objects that relate to a context of the surrounding environment (e.g., a type of establishment, such as a grocery store, a mechanic shop, a hardware store, a medical service provider, a restaurant, a taxicab, or the like).

As further shown in FIG. 5, process 500 may include determining, based on a notification that the transaction device was used to perform a transaction, a category associated with one or more objects that were identified in the surrounding environment at a time that the transaction was performed (block 530). For example, the AR device 340 (e.g., using processor 420 and/or memory 430) may determine, based on a notification that the transaction device was used to perform a transaction, a category associated with one or more objects that were identified in the surrounding environment at a time that the transaction was performed, as described above in connection with reference numbers 150 and 160 of FIG. 1B. As an example, the AR device may categorize the objects that were identified in the surrounding environment at the time that the transaction was performed as food items, medications, clothing items, electronics items, digital goods, musical instruments, or any other suitable category that may be relevant to the goods, services, and/or trades that were the subject of the transaction.

As further shown in FIG. 5, process 500 may include sending, to a transaction backend system, information that identifies an MCC associated with the transaction based on the category associated with the one or more objects that were identified in the surrounding environment at the time that the transaction was performed (block 540). For example, the AR device 340 (e.g., using processor 420, memory 430, and/or communication component 460) may send, to a transaction backend system, information that identifies an MCC associated with the transaction based on the category associated with the one or more objects that were identified in the surrounding environment at the time that the transaction was performed, as described above in connection with reference number 170 of FIG. 1B. As an example, the AR device may use machine learning techniques to determine a probable MCC associated with the transaction based on the state of the surrounding environment (e.g., objects detected) at the time that the transaction was performed, which may be reported to the transaction backend system to be associated with a record of the transaction for any suitable MCC-based use case (e.g., rewards programs, budgeting applications, or identifying merchants using incorrect or inaccurate MCCs).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An augmented reality device for categorizing a transaction, comprising:
    one or more memories; and
    one or more processors, coupled to the one or more memories, configured to:
        establish a link with a transaction device;
        scan a surrounding environment to identify one or more objects in the surrounding environment using computer vision;
        determine, based on a notification that the transaction device was used to perform a transaction, a category associated with one or more objects that were identified in the surrounding environment at a time that the transaction was performed;
        predict, using machine learning techniques, based on the surrounding environment, and based on the determined category, a merchant category code (MCC) associated with the transaction; and
        send, to a transaction backend system and based on predicting the MCC, information that identifies the MCC.

2. The augmented reality device of claim 1, wherein the link is established using near-field communication when the augmented reality device is in proximity to the transaction device or by reading information from the transaction device.

3. The augmented reality device of claim 1, wherein the one or more processors are configured to:
    determine, based on the notification that the transaction device was used to perform the transaction, information that indicates a geolocation associated with the surrounding environment at the time that the transaction was performed; and
    correlate the information that indicates the geolocation associated with the surrounding environment at the time that the transaction was performed with one or more data sources that indicate an establishment present at the geolocation,
        wherein the information that identifies the MCC associated with the transaction is further based on the establishment present at the geolocation.

4. The augmented reality device of claim 1, wherein the one or more processors are configured to:
    scan the surrounding environment to identify one or more visual characteristics associated with the surrounding environment using computer vision,
        wherein the information that identifies the MCC associated with the transaction is further based on the one or more visual characteristics associated with the surrounding environment at the time that the transaction was performed.

5. The augmented reality device of claim 1, wherein the information that identifies the MCC is associated with one or more attributes that correspond to the transaction.

6. The augmented reality device of claim 1, wherein the notification is received from the transaction device, a point-of-sale terminal, or the transaction backend system.

7. The augmented reality device of claim 1, wherein the augmented reality device and the transaction device are integrated within a single electronic device.

8. A method for categorizing a transaction, comprising:
scanning, by an augmented reality device, a surrounding environment;
determining, by the augmented reality device, based on a notification that a transaction device linked to the augmented reality device was used to perform a transaction, a category associated with one or more objects that were identified in the surrounding environment at a time that the transaction was performed;
predicting, by the augmented reality device, using machine learning techniques, based on the surrounding environment, and based on the determined category, a merchant category code (MCC) associated with the transaction; and
sending, by the augmented reality device, to a transaction backend system, information that identifies the MCC associated with the transaction based on predicting the MCC.

9. The method of claim 8, wherein the augmented reality device is linked to the transaction device using near-field communication when the augmented reality device is in proximity to the transaction device or by reading information from the transaction device.

10. The method of claim 8, wherein the one or more objects that were identified in the surrounding environment at the time that the transaction was performed are identified using computer vision.

11. The method of claim 8, comprising:
determining, based on the notification that the transaction device was used to perform the transaction, information that indicates a geolocation associated with the surrounding environment at the time that the transaction was performed; and
correlating the information that indicates the geolocation associated with the surrounding environment at the time that the transaction was performed with one or more data sources that indicate an establishment present at the geolocation,
wherein the information that identifies the MCC associated with the transaction is further based on the establishment present at the geolocation.

12. The method of claim 8, comprising:
scanning the surrounding environment to identify one or more visual characteristics associated with the surrounding environment using computer vision,
wherein the information that identifies the MCC associated with the transaction is further based on the one or more visual characteristics associated with the surrounding environment at the time that the transaction was performed.

13. The method of claim 8, wherein the information that identifies the MCC is associated with one or more attributes that correspond to the transaction.

14. The method of claim 8, wherein the notification is received from the transaction device, a point-of-sale terminal, or the transaction backend system.

15. A non-transitory computer-readable medium storing a set of instructions, the set of instructions comprising:
one or more instructions that, when executed by one or more processors of an augmented reality device, cause the augmented reality device to:
scan a surrounding environment to identify one or more objects in the surrounding environment using computer vision;
determine, based on a notification that a transaction device was used to perform a transaction, a category associated with one or more objects that were identified in the surrounding environment at a time that the transaction was performed;
predict, using machine learning techniques, based on the surrounding environment, and based on the determined category, a merchant category code (MCC) associated with the transaction; and
send, to a transaction backend system, information that identifies the MCC associated with the transaction based on predicting the MCC.

16. The non-transitory computer-readable medium of claim 15, wherein the one or more instructions further cause the augmented reality device to:
establish a link with the transaction device using near-field communication when the augmented reality device is in proximity to the transaction device or by reading information from the transaction device.

17. The non-transitory computer-readable medium of claim 15, wherein the one or more instructions further cause the augmented reality device to:
determine, based on the notification that the transaction device was used to perform the transaction, information that indicates a geolocation associated with the surrounding environment at the time that the transaction was performed; and
correlate the information that indicates the geolocation associated with the surrounding environment at the time that the transaction was performed with one or more data sources that indicate an establishment present at the geolocation,
wherein the information that identifies the MCC associated with the transaction is further based on the establishment present at the geolocation.

18. The non-transitory computer-readable medium of claim 15, wherein the one or more instructions further cause the augmented reality device to:
scan the surrounding environment to identify one or more visual characteristics associated with the surrounding environment using computer vision,
wherein the information that identifies the MCC associated with the transaction is further based on the one or more visual characteristics associated with the surrounding environment at the time that the transaction was performed.

19. The non-transitory computer-readable medium of claim 15, wherein the information that identifies the MCC is associated with one or more attributes that correspond to the transaction.

20. The non-transitory computer-readable medium of claim 15, wherein the notification is received from the transaction device, a point-of-sale terminal, or the transaction backend system.

* * * * *